Feb. 13, 1951 H. R. MOLTON 2,541,430

TONE-ARM AND SUPPORT THEREFOR

Filed Sept. 10, 1945 4 Sheets-Sheet 1

INVENTOR.
Howard R. Molton
BY
Thos. A. Lowney, Jr.
Atty.

INVENTOR.
Howard R. Molton,
BY [signature]
Atty.

INVENTOR.
Howard R. Molton,
BY Tho. A. Banning
Atty.

Feb. 13, 1951 H. R. MOLTON 2,541,430

TONE-ARM AND SUPPORT THEREFOR

Filed Sept. 10, 1945 4 Sheets-Sheet 4

INVENTOR.
Howard R. Molton,
BY Thos. A. Banning Jr.
Atty.

Patented Feb. 13, 1951 2,541,430

UNITED STATES PATENT OFFICE 2,541,430

TONE ARM AND SUPPORT THEREFOR

Howard R. Molton, Chicago, Ill., assignor, by mesne assignments, to Raytheon Manufacturing Company, Newton, Mass., a corporation of Delaware Application September 10, 1945, Serial No. 615,260

6 Claims. (Cl. 274—23)

This invention relates to improvements in tone-arms for phonographs, and the like, and to the supports for such tone-arms. These tone-arms must be so arranged that they may move inwardly towards the rotational axis of the disk record being interpreted, and may thereafter be moved outwardly to permit placement of a fresh record in playing position; and they must also be so supported that they may be raised from the record being interpreted and may afterwards be lowered into engagement with the sound track of a fresh record for playing the same. Many such schemes have heretofore been provided.

The stylus or needle which engages the sound track of a laterally modulated sound track must vibrate laterally during the translation of such sound track to follow the undulations of such track. This is true of those records in which the sound track is of the usual form having such lateral undulations; and in the case of a sound track having vertical undulations the stylus must vibrate vertically; but in either case the vibrations of the stylus must faithfully follow and interpret these undulations in order to produce a faithful sound reproduction. In either case, also, such vibrations occur only in a single plane, either a horizontal plane or a vertical plane as the case may be. The undulations to be translated fall within the usual range of audible sensitivity, usually between about sixteen per second and fifty thousand per second. Vibrations either below or above such range are generally considered to be outside of the range of human audibility. The present invention concerns itself with provision of a tone-arm of such characteristics and such support that the stylus carried by it may faithfully follow vibrations of such general range of frequencies so as to produce faithful reproduction; and specifically these improvements are applicable to tone arms usable with that type of record in which the undulations are parallel to the plane of the disk record, as distinguished from being at right angles to such plane, but I wish it understood that said improvements may also be used in proper applications to the case of records having vertically vibrational sound tracks.

Assuming, first, the case of a record having a horizontally undulating sound track it will be seen that as the stylus vibrates such vibration will tend to produce a lateral vibration of the tone-arm also, since said stylus projects to a position either below or above the axis of the tone-arm; and further, that such vibrations of the stylus will tend to produce rotational vibrations of the tone-arm about its own axis. If the tone-arm to be so designed as to be relatively light but stiff it will be substantially free of such lateral vibrations, assuming that it be properly supported, but nevertheless it will be subjected to such rotational vibrational tendency. Any such rotational vibration of the tone-arm will interfere with faithful reproduction of the sound track and is therefore undesirable and should be avoided if possible. It is a prime object of the present invention to so design and to so support the tone-arm as to largely or even completely avoid such rotational vibrations within any frequency of vibrations within the audible sound range. In this connection it is also to be noted that whenever such vibrations occur there is also a tendency to set up vibrations at harmonic frequencies, and these also may become very objectionable in sound interpretation. It is also noted that the amplitude of any vibrations set up under the influence of the frequency being interpreted from the sound track will be greatly magnified and made much more objectionable when such vibrations happen to be the same as or close to the natural frequency of the tone-arm for rotational vibration. In such case whenever the stylus encounters a portion of the sound track having a frequency the same as or close to such natural frequency for rotational vibrations, there will occur sudden and objectionable bursts of amplitude of interpretation giving rise to corresponding sudden bursts of volume of sound produced by the pick-up, whether electric or mechanical. It is a further prime object of the present invention to avoid such conditions by improved design and support of the tone-arm.

If the tone-arm be considered as a rigid element, as far as lateral stiffness is concerned and also as far as stiffness against rotational distortion is concerned, then it may be considered that there is a spring constant at the point of attachment of the stylus to the free end of the tone-arm; and if the mounting end of the tone-arm be so supported that there is present at that point both a spring constant and also a resistance element producing resistance against torsional vibration, then the first mentioned spring mounting will be in parallel with the second mentioned spring mounting, and the resistance element will be in parallel with the second mentioned spring mounting; or in other words, we shall have the condition of a spring mounting in parallel with a combination of another spring mounting and resistance element in parallel. Under these conditions it can be shown that the amplitude of vibrations (torsional) which such rigid tone-arm will suffer under various frequencies impressed on its free end will be as follows:

$$A=\frac{K_1a}{\sqrt{W^2R^2+(W^2I-(K_1+K_2))^2}}$$

where A equals amplitude of torsional vibration of tone-arm, $K_1$ equals spring constant of the stylus support on the free end of the tone-arm, $a$ equals the angular amplitude of lateral vibrations or excursions of the tip of the stylus under the influence of the sound track, W equals the frequency of the vibrations, R equals the resistance constant of the mounting of the tone-arm itself, I equals the rotational inertia of the tone-arm about its center line, and $K_2$ equals the spring constant of the mounting of the tone-arm itself.

The foregoing relationship may be mechanically indicated by the showing of Figure 16, hereinafter referred to, wherein the several elements referred to are shown by mechanical equivalents related to each other for vertical vibrations, but the showing of that figure is also applicable to the case of rotational vibrations. Examination of that figure shows that the resistance element R is shown in parallel with the spring element $K_2$, which is a spring element located at the position of the tone-arm mounting, and this spring element will be discussed further hereinafter. At this point it may be mentioned that this spring element is preferably of a small spring constant. Under these conditions it will be seen that the resistance element represented by the element R exerts a large influence on the nature of the vibrational characteristics of the so-supported tone-arm. In fact, it may be stated that with a highly damped tone-arm mounting, the amplitude of torsional vibrations is largely resistance controlled, and the tone-arm may be made of light weight and simple design with a low rotational inertia about the center line or axis of the tone-arm. It will also be evident from examination of the foregoing equation that a very large value of R will greatly reduce the value of A (amplitude of rotational vibrations), since these constants occur in squared amount in the denominator of such equation. $K_1$, $K_2$ and I are chosen to place the natural or resonant frequency of the assembly below the useful audio range to be translated.

Evidently it is desirable to completely eliminate the element $K_2$, if possible, this constant being the spring constant of the tone-arm mounting itself. However, as I shall presently show a suitable mounting of suitable damping or resistance material alone may not (and generally will not) possess completely satisfactory characteristics as a supporting medium for the tone-arm under practical conditions, it becomes desirable or necessary to accompany such damping mounting with other mechanical means to effect such fully satisfactory support; and in such case such other mechanical supporting means will in itself possess a spring constant ($K_2$), for which reason I have included this constant in the foregoing analysis. I shall presently discuss this mechanical support in fuller detail.

In Figure 16 the several elements (stylus, stylus connection or mounting to the tone-arm, tone-arm proper, damping mounting, and supplementary mechanical support) are shown in a scheme wherein the analysis may be made as a translationary vibration, but this analysis is not changed for substituting rotations for translations, and torques for forces. In this analysis, also, the very small damping effect of the crystal mounting to the tone-arm is neglected or disregarded; so that the assembly may be considered as one spring in parallel with another spring and damping element in parallel, as already mentioned. Also, in the showing of Figure 16 the excursions of the stylus point are represented by the vertical motions of the base element to which $K_1$ is connected, and the vibrations of the tone-arm (torsionally) are represented by the movements of the inertia I.

From this analysis it becomes evident that it is very desirable to so design and construct the mounting for the tone-arm that a high degree of damping effect is produced therein. This means in effect that said mounting should comprise a highly damping body interposed between the tone-arm proper and the rigid staff or element by which the tone-arm parts are carried from the base or frame of the record reproducer. This body should therefore be of a substantially non-elastic material, or a material whose reaction to a change of shape is primarily resistive and not elastic. Such a material is what is known as "soft Pyralin," a cellulose nitrate product of E. I. du Pont de Nemours & Company. This material is of a highly damping nature, and said material has a high internal resistance against distortion; but under sustained force this material will suffer a permanent distortion, assuming a new contour or form to which it has been distorted. If such a mass alone be used as the tone-arm support between the supporting staff or element and the tone-arm then such damping body will suffer such distortion after an interval of time that the tone-arm will not be properly supported in relation to the turntable of the phonograph. Such distortion of this damping body will be due to one or more of several forces to which such body is subjected. One of these forces is the weight of the tone-arm itself, which weight, acting on such damping body support alone, will in time distort such body in a downward direction, permitting the tone-arm to settle to an improper position. Another force is that of rotation or rocking tendency of the tone-arm about its own axis. In this connection it is understood that a widely used form of tone-arm is one which is supported on a horizontal, transversely extending axial mounting so that said tone-arm may be raised and lowered in proper manner to raise the stylus from the record, and to afterwards replace the stylus into contact with the record's sound track. Since such axial mounting extends transversely of the tone-arm's length, any rocking tendency exerted on the tone-arm by reason of its non-symmetry, or other cause, will tend to twist such axial mounting about the axis of the tone-arm, and such tendency will in time act to distort the damping support, unless otherwise resisted. Another force to which the tone-arm may be subjected is a force acting lengthwise of such tone-arm and such a force will also tend to distort such a solely damping material support. Nevertheless such a damping material support is admirably adapted to meet the requirements imposed by the relationship shown by the previously discussed equation, provided that means be supplied to supplement the characteristics of such material in a way which will take care of these forces of a more or less constant nature which tend to produce permanent distortion of such damping body. Such supplementing element is indicated by the constant $K_2$ of such equation.

It is a further object of my present invention to provide such a supplemental support which will effectively serve to take care of these forces which tend to produce permanent distortion of the damping body, but which supplemental support shall be so designed and of such a nature that its constant $K_2$ shall be small in comparison to other elements and factors of the equation, thus producing the overall results which I have already pointed out herein.

It may also be stated that it is a prime object of my present invention to provide such a combination support (composed of the highly damping body and a spring characterized element), but in which combination support the constant R is high in comparison to the constants $K_1$ and $K_2$, and especially in comparison to the constant $K_2$. In other words, it is an object of the invention to provide such combination support in which the constant $K_2$ is small in comparison to the constant R, or the resistance element of the damping element itself.

In connection with the foregoing, it is a further and more specific object of the invention to provide a supplemental support supplementing the damping body, which supplemental support shall have a very low spring constant when considered in relation to torsional vibrations of the tone-arm itself, since these vibrations are the ones here particularly considered; and which supplemental support shall have a relatively large mechanical strength and resistance against distortion of the resistance element under forces other than those of torsional vibration of the tone-arm.

Other objects and uses of the invention will appear from a detailed description of the same, which consists in the features of construction and combinations of parts hereinafter described and claimed.

Figures 1, 2, 3:
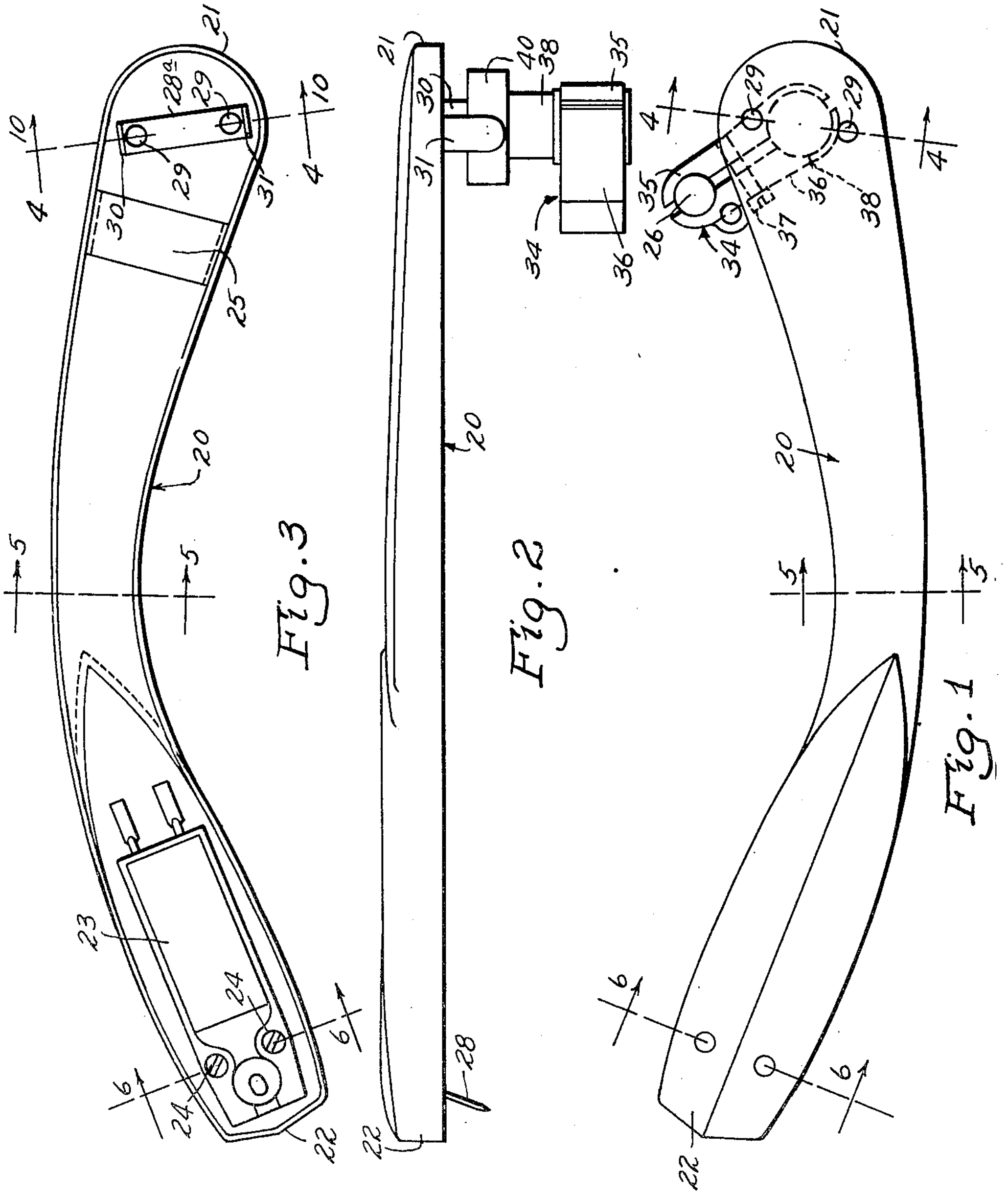
Figure 1 shows a typical tone-arm supported by a support embodying the features of the present invention.
Figure 2 shows a side elevation corresponding to Figure 1.
Figure 3 shows a bottom plan view corresponding to Figures 1 and 2.
Figure 6:
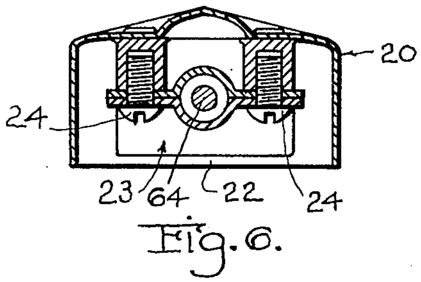
Figure 6 shows a cross-section taken on the lines 6—6 of Figures 1 and 3, looking in the directions of the arrows.
Figure 4:
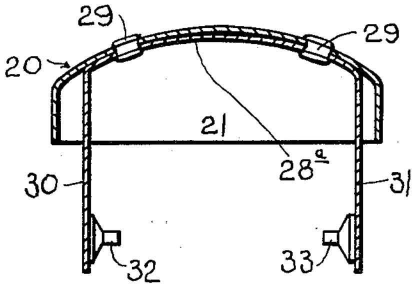
Figure 4 shows a cross-section taken on the lines 4—4 of Figures 1 and 3, looking in the directions of the arrows, certain parts being omitted from this view for clarity of illustration.
Figure 10:
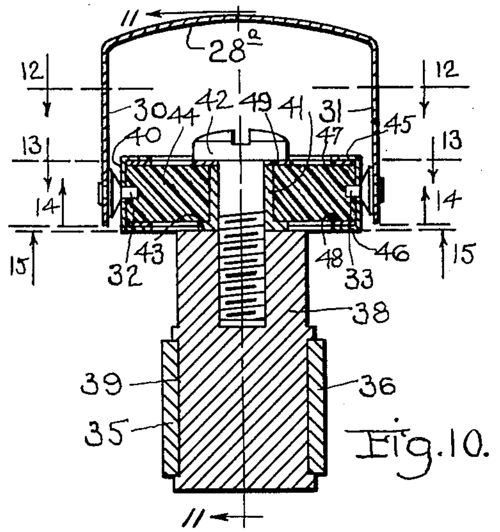
Figure 10 shows another section taken on the lines 10—10 of Figure 3, omitting the tone arm but showing the complete tone-arm support, including the high resistance damping element, and the specific form of spring element combined therewith.
Figure 11:
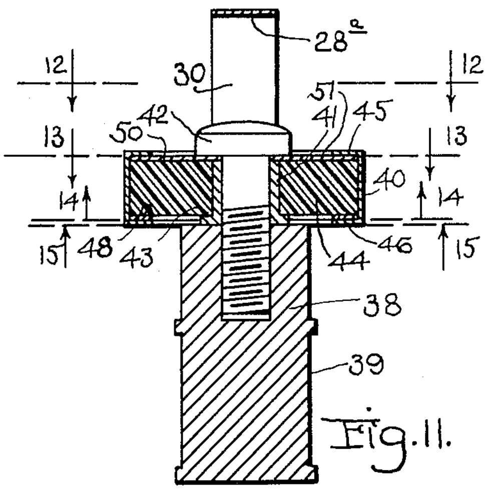
Figure 12:
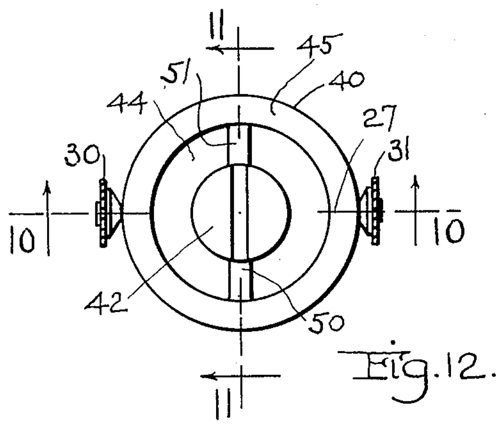
Figure 15:
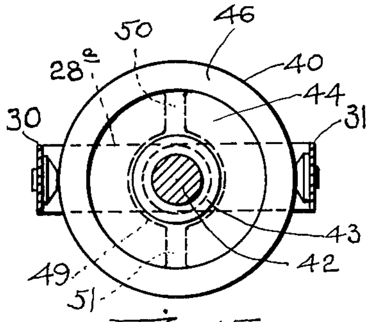
Figure 14:
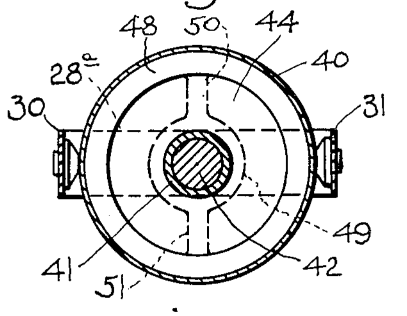
Figure 13:
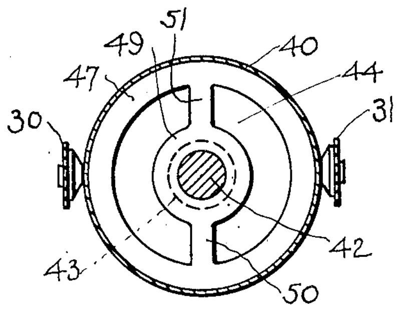
Figure 16:
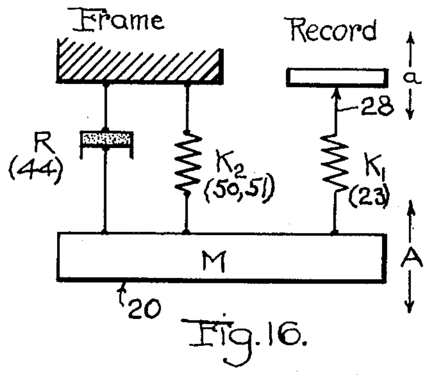
Figure 17:
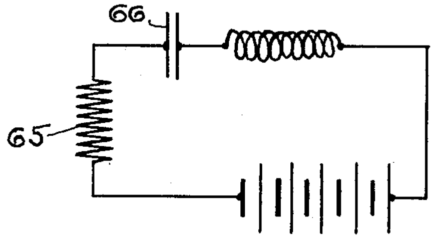
Figure 18:
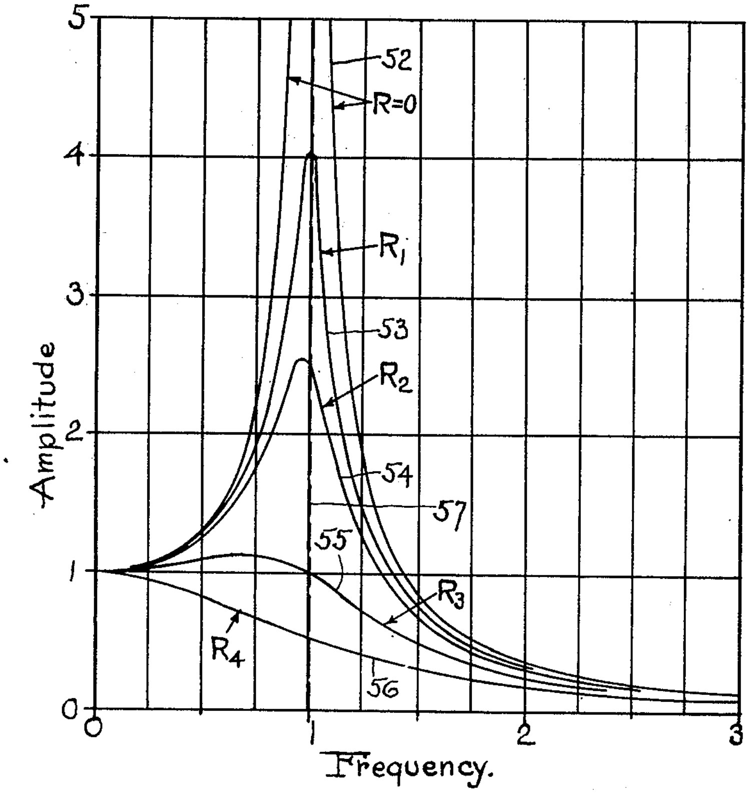

Figure 11 shows a cross-section taken on the line 11—11 of Figure 10, looking in the direction of the arrows; and Figures 10 and 11 may also be considered as sections taken on the lines 10—10 and 11—11, respectively, of Figure 12, looking in the directions of the arrows thereon shown;

Figure 12 shows a section taken on the lines 12—12 of Figures 10 and 11, looking in the directions of the arrows, and it shows in plan view the specific form of spring supplemental element provided for the tone-arm support in addition to the damping material herein generally called for;

Figure 13 shows a section taken on the lines 13—13 of Figures 10 and 11, looking in the directions of the arrows, and it shows still more clearly than Figure 12 the form of the spring element provided supplemental to the damping element;

Figure 14 shows a section taken on the lines 14—14 of Figures 10 and 11, looking in the directions of the arrows, and it shows the bottom of the damping element and the manner whereby the same is connected to both the inner and outer elements;

Figure 15 shows a section taken on the lines 15—15 of Figures 10 and 11, looking in the directions of the arrows, and it shows the clamping means to secure the several parts together;

Figures 4 to 15 inclusive are on enlarged scale as compared to Figures 1, 2 and 3;

Figure 16 shows diagrammatically the mechanical relationship between the several elements, reduced to the condition of translatory vibrations;

Figure 17 shows diagrammatically by means of electrical elements relationships corresponding to those exemplified in Figure 16; and Figure 18 shows a series or family of curves showing the relationship of amplitude of vibration with variation of frequency to and beyond the natural period of the system, for various ratios between the factors of the combination, showing that as the resistance constant is increased in relation to the spring constant the amplitude of vibration falls, including the amplitude at resonant frequency, until finally there is substantially no rise of amplitude even at resonant frequency; and the resonant frequency is shown by means of the broken vertical line in this figure.

Figure 5:
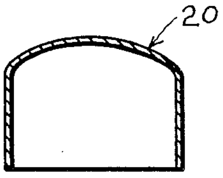
Figure 5 shows a cross-section taken on the lines 5—5 of Figures 1 and 3, looking in the directions of the arrows.

Referring first to Figures 1, 2 and 3, I have therein shown a typical tone-arm having applied thereto the support embodying the features of the present invention. This tone-arm is shown as being of generally U-shaped cross-section, as shown in Figure 5, being designated as 20, and may be formed of light sheet material such as aluminum. This section is closed at its mounted end 21, and at its free end 22; and said free end is shown as being slightly broadened to receive the crystal pick-up 23 of any suitable form, such as a Rochelle salts crystal. This pick-up element is securely fastened to the interior of the enlarged portion of the tone-arm, as by the screws 24; and sometimes there is included a slight amount of damping material at this point of connection. However, this is of small effect on the analysis of the structure as herein given, and may be disregarded in estimates as analyzed herein. For all practical purposes this pick-up may be considered as a portion of the rigid tone-arm body.

The section of the tone-arm is such that it may be considered as a rigid body from end to end for the present analysis; and sometimes it is provided with a reinforcing cross member such as the strap 25 which improves its rigidity. The body of the tone-arm may also be specially cross-sectioned to improve its rigidity.

It is desired to provide a support for the end portion 21 of this tone-arm such as to provide for swinging of the tone-arm about a vertical axis relatively close to or intersecting the body of the tone-arm; and to also make provision for raising and lowering of the free end of the tone-arm to meet requirements of the placement and removal of the stylus onto and from the record. In other words, provision must be made for rock of the tone-arm about a vertical axis and also about a horizontal transverse axis and these movements must be possible with great freedom and without interference from the mounting itself. The vertical axis about which the tone-arm shown in the drawings rocks is shown at 26. It may take the form of a vertical rotatable post or other supporting element. The horizontal transverse axis about which raising and lowering are effected is shown by the line 27 which is co-incident with the section line 10—10. This transverse axial line passes somewhat below the body of the pivoted end of the tone-arm, as is evident from Figure 2 in particular.

It is desired that as the stylus 28 connected to the pick-up is vibrated back and forth in following the sound track, the vibrations communicated to the body of the tone-arm (considered as a rigid body) and supported at its pivoted end shall be so treated that no expected frequency within the audible range shall produce a condition of resonance in the rotational or torsional vibrations of the tone-arm. In Figure 16 the several elements are designated by the factors used in the foregoing equation for ready comparison. Additionally, the stylus is shown by proper numeral 28, the body of the tone-arm is shown by its numeral 20, the frame of the machine (of which the post 26 is a part) is appropriately designated, and the spring constant $K_1$ of the stylus and connection to the tone-arm is indicated correspondingly.

In a convenient embodiment of my present invention I provide a U-shaped element $28^a$ secured to the supported end of the tone-arm, as by the rivets 29, the arms 30 and 31 of this element being provided with the inwardly projecting studs 32 and 33. I also provide an arm securely fastened to the upper end of the post 26, this being the arm 34 comprising the two companion sections 35 and 36 clamped together by the clamping element 37, such as a screw. The other ends of these sections 35 and 36 clamp between them the short post 38 (shown in detail in Figures 10 and 11), said post being preferably provided with the shallow groove 39 to receive the clamping sections and aid in retaining the post against endwise shift with respect to the clamping sections.

It is here noted that when the post 38 is clamped securely as just above explained it constitutes a rigid vertical stand, and such condition of rigidity exists notwithstanding that the arm 34 composed of the sections 35 and 36 is free to rock about the center or axis 26. In other words, in any rocked position of the arm 34 the post 38 constitutes a rigid vertical support for the end of the tone-arm connection.

I have provided a ring element 40 (see Figures 10 to 15, inclusive), which may be received between the free ends of the arms 30 and 31 of the U-shaped member $28^a$; and suitable holes are provided in this ring element at diametrically opposite points to receive the studs 32 and 33, respectively. By slightly springing the arms 30 and 31 apart these studs may be readily set into the holes, and then the springiness of the U-shaped member will restore engagement of the studs with the holes in permanent manner; but the springiness should not be sufficient to cause any binding between the faces of the arms and the outer facial wall of the ring element, but only to retain the studs in pivotal connection with the ring member. Thus a transverse joint connection is established between the tone-arm proper and the ring element. It remains to show how I establish a connection between said ring element and the post 38 having the desired characteristics as hereinbefore analyzed.

I provide a collar 41 secured to and upstanding from the post 38 a distance substantially as great as the vertical dimension of the ring element 40. This collar is secured to the post 38 as by the screw 42. It is noted that the lower end of the collar is preferably provided with the outwardly extending shoulder 43, but this shoulder does not reach out more than a relatively slight distance from the body of the collar.

Between the collar 41 and the ring element 40 I place a body of the high resistance damping material, such as soft Pyralin already mentioned. This is the body 44 of Figures 10 and 11 in particular. Preferably this body is of shape and size to completely occupy the annular space between the collar 41 and the ring element 40; in other words, this body of damping material has a diameter to nicely occupy the interior of the ring element, and to set securely over the collar, and has a transverse dimension to substantially equal the axial length of the collar and the ring element. The outer edge periphery of this damping body is securely cemented or otherwise adhered to the inner face of the ring element; and the inner hole or bore of the damping body is also securely cemented or adhered to the outer face of the collar. These cementings are produced in any convenient manner which will adhere the damping body to the ring element and to the collar in such fashion that the damping body becomes the principal or sole connecting means between the collar and the ring element. Under these conditions vibrations of the ring element (tone-arm) must be communicated to the collar (post 38 and stationary support) solely or principally through the body of damping material. I have found that a convenient and satisfactory cementing agent for this purpose comprises Pyralin dissolved in acetone or similar solvent. Upon evaporation of such acetone the parts are adhered together with great tenacity.

Since the adhesion of the damping body to the collar and to the ring element must be very secure and certain and permanent I prefer to make further provision for ensuring such adhesion. To this end the edge portions, of the ring element, 45 and 46 may be formed over the edge portions of the damping body after the parts have been set together. However, such overforming of these edge portions should not be sufficient to reduce the free portion of the body to such an extent as to interfere with freedom of vibration of the ring element with respect to the collar. It will also be found desirable to set a narrow thin ring 47 between the damping body and the flanged portion 45 of the ring, and another narrow thin ring 48 between the damping body and the flanged portion 46 of the ring, these rings 47 and 48 also being cemented to the peripheral face portions of the damping body. The ring 47 may comprise a portion of the supplemental spring element heretofore referred to (when such supplemental spring element is used), as will presently appear.

The shoulder or flange 43 of the collar may constitute a narrow abutment against which the lower inner peripheral face of the damping body may be cemented to assist in securing tenacious adhesion at that location; and if desired a narrow thin ring 49 may be set against the upper face portion of the damping body at the position of the collar 41 to constitute a further surface for adhesion of the damping body at that location; but it will be understood that both of these surfaces are of small radial dimension, and do not materially interefere with the freedom of vibration of the ring element 40 with respect to the collar, since in all cases the radial dimension of the free portion of the damping body is sufficient to permit the necessary freedom of vibration. The vertical dimension of the damping body (axially) is made the same as the clearance between the shoulder or flange 43 and the ring 49, so that said ring may set against the end of the collar and be clamped thereto by the screw 42, the screw coming to seat against the ring in firm manner, and without crushing the damping body at that location.

It will now be seen that torsional vibrations of the tone-arm tend to rock the U-shaped element $28^a$ about an axis extending normal to the sheet on which Figure 10 is drawn, said axis extending through the transverse axis passing between the studs 32 and 33. Such rocking is equivalent to rocking about an axis extending parallel to the sheet on which Figure 11 is drawn, and passing through said studs (not shown in Figure 11). Any rocking of the tone-arm due to a rising or falling of its free end will merely produce a rock on the axis extending between the studs 32 and 33. It is desired to damp the first mentioned class of vibrational rockings; and it is seen that such rockings must be transmitted from the ring element through the damping body to the collar 41. By making said damping body of the characteristics hereinbefore mentioned the desired damping is secured.

Fundamentally such a damping body will take care of the vibrational problems admirably; but it is now noted that certain forces must also be transmitted between the ring element and the collar other than such forces of vibration, and these I shall now discuss in further detail.

Evidently the weight of the tone-arm sustained at its pivoted end (other than the weight sustained by the stylus) must be transmitted through the connection which exists between the ring element 40 and the collar 41. If the only connection be that of the damping body itself it is evident that after an interval of time there will occur a vertical deformation of such body permitting the ring to sag. Likewise any forces delivered to the tone-arm lengthwise thereof will have to be communicated through such body, and this is also true of lateral forces of translation. Generally the first mentioned or weight force will be found to be most important of these three. Torsional forces due to lifting and lowering of the tone-arm are taken care of by the pivotal mounting, and occur on the axis passing through the studs 32 and 33. Torsional forces tending to rock the tone-arm from side to side may be transferred through the damping body but these are of small value as the mounting of the parts to rock on the vertical axis 26 is such as to provide for great freedom of rock. Torsional or rocking forces about the longitudinal axis of the tone-arm due to vibrations are also transmitted through the damping body, and these are the ones which have been specially considered herein.

In order to take care of the forces of translation just mentioned, and without permitting the damping body to be permanently deformed, and also without material interference with the principles which have been discussed in detail, I have provided a connection between the ring element 40 and the collar 41, supplemental to the body of damping material 44. This spring connection is so designed as to permit great freedom of spring movement about the axis extending lengthwise of the tone-arm—in other words, is so designed as to interfere only very slightly with the vibrational rocking movements about the axis which is normal to the sheet on which Figure 10 is drawn, and extending through the axis passing between the lugs 32 and 33; but said spring element is so designed as to transmit forces of translation in all directions between the ring element 40 and the collar 41 with considerable stiffness, or at any rate sufficient stiffness to transmit the needed forces without material deformation of the damping body. Such a spring element I shall now disclose in detail.

Referring particularly to Figures 10 to 15, there are seen the radial arms 50 and 51 which extend between the outer ring 47 and the inner ring 49 already referred to. In fact a satisfactory and convenient design of parts is one in which these two rings and the radial arms are all formed from a thin sheet of springy metal stamped to proper shape and size. These arms are therefore thin; and they are also made rather narrow as well shown in Figures 12 and 13. Thus any rocking movements transmitted between the ring element 40 and the collar 41 about an axis parallel to these arms 50 and 51 will be substantially free of interference due to the presence of such spring arms; but any other rocking or translatory forces exerted between the ring element 40 and the collar 41 will be effectively interfered with by said arms 50 and 51. This is evident from the following.

A tendency to rock the ring element 40 about an axis parallel to the section line 10—10 shown on Figure 12 will be resisted since it will tend to bend or deflect these arms; a tendency to rock the ring element 40 about an axis normal to the sheet on which Figure 12 is drawn and passing through the center of said figure will be resisted since it will tend to bend or deflect these arms against their stiffest section; and forces of translation in any one of the three possible directions will also be effectively resisted by these arms. It is also noted that tendency in any case to produce a motion of the ring element 40 with respect to the collar 41, which motion would require elongation of these arms, is effectively resisted by tensile stresses set up in the arms, since the inner and outer rings 49 and 47 support the end portions of these arms very effectively against radial displacement.

It is to be specially noted that by making these arms of thin springy material such as sheet metal, the foregoing desired results are secured without producing material stiffness in the arms themselves against spring distortions torsionally about the axis which extends lengthwise of them. Such torsional distortions of these arms are produced by the torsional vibrations of the tone-arm about its own axis, since these spring arms extend substantially parallel to the tone-arm axis. Also, by locating these spring arms at the upper face of the damping body they are brought substantially close to the axis of the tone-arm, and thus are subjected more nearly to the direct torsional vibrations which the tone-arm itself suffers.

It will be understood that the constant R of the equation previously discussed is of such a large value that the variations in the reactance factor at or near the point of resonance do not substantially affect the amplitude of torsional vibrations. It is desired that the tone-arm have a frequency response similar to that shown by curve $R_4$ of Figure 18, said curve having no rise of amplitude at the resonant frequency.

Reference may now be had to this Figure 18 which shows a family of curves relating the amplitude of vibrations to the constants heretofore discussed and in comparison to frequencies. These curves 52, 53, 54, 55 and 56 are for progressively larger values of R. It is noted that as said value is increased, the peaks become lower, until finally a condition is reached when a substantially non-peaked curve is produced, such as the curves 55 and 56. Such being the case a more or less complete damping action has been produced, and even at frequencies approximating resonance there is substantially no increase in the amplitude of the vibrations.

It is intended that the parts should be so designed that the resonant frequency shall be below the range of audible frequencies, so that in any case all sound translations shall be at frequencies higher than such resonant frequency, indicated by the line 57 in Figure 18; but by use of the features herein disclosed, primarily by use of the damping connection, any variations of amplitude, such as shown by the shapes of the curves to the right of such resonant line 57, are greatly reduced, and variations in translated volume are correspondingly reduced.

Figure 7:
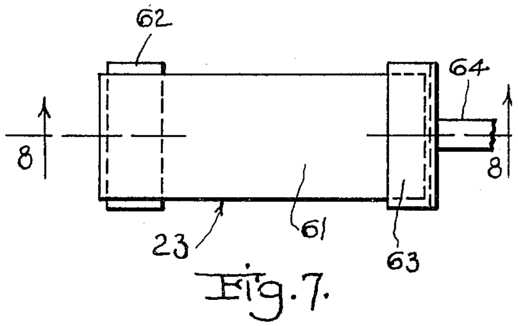
Figure 7 shows a plan view of a typical crystal generator such as may be used for the electrical pick-up embodied in the tone-arm.
Figure 9:
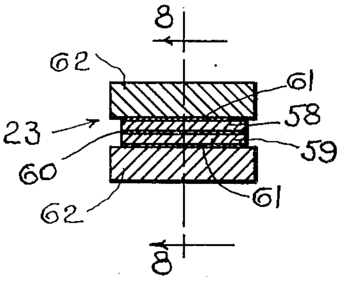
Figure 9 is a sectional view taken on the line 9—9 in Figure 8.
Figure 8:
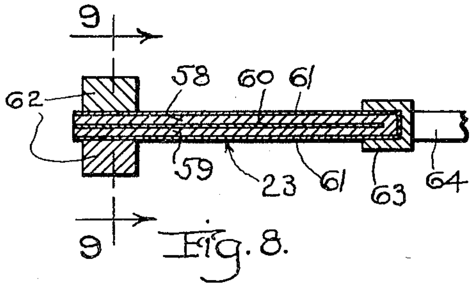
Figure 8 shows a longitudinal section taken on the line 8—8 of Figures 7 and 9, looking in the directions of the arrows.

Evidently the stylus 28 may actuate any suitable form of sound translation device, but in the particular scheme illustrated in the drawings I have shown the crystal pick-up shown in detail in Figures 7, 8 and 9. This includes the crystal elements 58 and 59 having between them the sheet of foil 60, and the outer sheet of foil 61 embraces the outer faces of these elements 58 and 59; so that the sheets 60 and 61 constitute the electrical terminals of the pick-up. The end portions of this combination are clamped by the clamping devices 62 and 63. The device 62 is secured rigidly to the case of the pick-up in usual manner; and the clamp 63 is connected to the short rod or stem 64, which in turn is connected to the stylus or carries said stylus, so that the lateral vibrations of the stylus are translated into rockings of the stem 64, thereby subjecting the crystals to the desired deformations according to sound track frequencies to be translated.

The mounting of this pick-up into the tone-arm is substantially free of damping effect, and any such slight damping effect as may be present at this location may be disregarded in the analysis heretofore given.

It is noted that the studs 32 and 33 which serve to provide the pivotal connection between the tone-arm and the ring 40 are provided with conical bases. These serve to set slightly into the holes of the ring element and to ensure that the spring effect of the U-shaped element 28ᵃ shall bring engagement of the arms 30 and 31 with these pivotal studs before any facial contact occurs between the faces of the arms and the ring element.

The constant $K_2$ may represent the spring effect of both of the elements R and the spring connection; but in practical effect the spring effect of the damping element or body is so extremely small as to exert substantially no noticeable effect on the combination mounting. This damping body is for all practical considerations free of any spring constant in itself.

In the diagram of Figure 17 the resistance element 65 may be considered to correspond, in resonance effects, to the constant R of the mounting herein disclosed; and the condenser 66 may be compared in its effects to the spring constant $K_2$. It will be noted that when the resistance element 65 of the circuit of Figure 17 is large in comparison to the condenser element 66, the effects of such resistance element become dominant in determining the resonant frequency.

I claim:

1. In a phonograph having a disc record support, an elongated tone arm with a pick-up element at one end thereof adapted to cooperate with a groove in said record and pivotally mounted at the other end, the combination comprising a vertical standard rigidly mounted with respect to said record support about which said arm is adapted to pivot, a resilient cap of vibration damping material secured to the top of said standard and extending horizontally away therefrom, an elongated member of substantially rigid material secured to the top of said standard and extending in two diametrically opposed directions therefrom substantially coextensively with a horizontal surface of said cap, rigid means clamped about the outer periphery of said cap to secure the outer ends of said elongated member to said surface near the outer periphery thereof, and means to support said other end of said arm from points on said means clamped about the outer periphery of said cap.

2. In a phonograph having a disc record support, an elongated tone arm with a pick-up element at one end thereof adapted to cooperate with a groove in said record and pivotally mounted at the other end, the combination comprising a vertical standard rigidly mounted with respect to said record support about which said arm is adapted to pivot, a round disc-like cap of vibration damping material secured to the top of said standard and extending horizontally away therefrom, an elongated member of substantially rigid material secured to the top of said standard and extending horizontally in two diametrically opposed directions therefrom substantially to the outer edge of a horizontal surface of said cap, said elongated member being narrow with respect to its length, means rigidly clamped about the outer periphery of said cap securing the ends of said elongated member to said surface near said outer edge, and means to support said other end of said arm from two diametrically opposed points on said means clamped about the outer periphery of said cap.

3. In a phonograph having a disc record support, an elongated tone arm with a pick-up element at one end thereof adapted to cooperate with a groove in said record and pivotally mounted at the other end, the combination comprising a vertical standard rigidly mounted with respect to said record support about which said arm is adapted to pivot, a round disc-like cap of vibration damping material secured to the top of said standard and extending horizontally away therefrom, an elongated member of substantially rigid material secured to the top of said standard and extending horizontally in two diametrically opposed directions therefrom substantially to the outer edge of a horizontal surface of said cap, said elongated member being narrow with respect to its length, means rigidly clamped about the outer periphery of said cap securing the ends of said elongated member to said surface near outer edge, and means to support said other end of said arm from two diametrically opposed points on said means clamped about the outer periphery of said cap, the diametrical line connecting said two points and the long dimension of said elongated member being disposed substantially mutually perpendicularly in the plane of said surface.

4. In a phonograph having a disc record support, an elongated tone arm with a pick-up element at one end thereof adapted to cooperate with a groove in said record and pivotally mounted at the other end, the combination comprising a vertical standard rigidly mounted with respect to said record support about which said arm is adapted to pivot, a round disc-like cap of vibration damping material secured to the top of said standard and extending horizontally away therefrom, a substantially rigid ring secured to the outer periphery of said cap, an elongated member of substantially rigid material secured to the top of said standard and extending horizontally in two diametrically opposed directions therefrom substantially to the outer edge of a horizontal surface of said cap, said elongated member being narrow with respect to its length, means securing the ends of said elongated member to said ring, and means to support said other end of said arm from said ring.

5. In a phonograph having a disc record support, an elongated tone arm with a pick-up element at one end thereof adapted to cooperate with a groove in said record and pivotally mounted at the other end, the combination comprising a vertical standard rigidly mounted with respect to said record support about which said arm is adapted to pivot, a round disc-like cap of vibration damping material secured to the top of said standard and extending horizontally away therefrom, a substantially rigid cylinder secured to the outer periphery of said cap, an elongated member of substantially rigid material secured to the top of said standard and extending horizontally in two diametrically opposed directions therefrom substantially to the outer edge of a horizontal surface of said cap, said elongated member being narrow with respect to its length, means securing the ends of said elongated member to said cylinder, and means to support said other end of said arm from said cylinder.

6. In a phonograph having a disc record support, an elongated tone arm with a pick-up element at one end thereof adapted to cooperate with a groove in said record and pivotally mounted at the other end, the combination comprising a vertical standard rigidly mounted with respect to said record support about which said arm is adapted to pivot, a round disc-like cap of vibration damping material secured to the top of said standard and extending horizontally away therefrom, a substantially rigid cylinder secured to the outer periphery of said cap and overlapping both horizontal surfaces thereof for a small distance compared to the radius thereof, an elongated member of substantially rigid material secured to the top of said standard and extending horizontally in two diametrically opposed directions therefrom substantially to the outer periphery of one horizontal surface of said cap, means including an overlapping element of said cylinder for securing the ends of said elongated member to the outer periphery of said one horizontal surface, and means to support said other end of said arm from said cylinder.

HOWARD R. MOLTON.

REFERENCES CITED

The following references are of record in the file of this patent:

UNITED STATES PATENTS

| Number | Name | Date |
|---|---|---|
| 1,883,100 | Terrell | Oct. 18, 1932 |
| 1,996,511 | Harrison | Apr. 2, 1935 |
| 2,154,093 | Hutter | Apr. 11, 1939 |
| 2,177,692 | Di Toro | Oct. 31, 1939 |
| 2,254,732 | Dally | Sept. 2, 1941 |
| 2,331,122 | Jones | Oct.5, 1943 |
| 2,342,457 | Dally | Feb. 22, 1944 |
| 2,363,655 | Dally | Nov. 22, 1944 |